United States Patent [19]

Woodbridge

[11] 3,864,085

[45] Feb. 4, 1975

[54] GLUTATHIONE REAGENT AND TEST METHOD

[75] Inventor: Joseph Eliot Woodbridge, Princeton, N.J.

[73] Assignee: Princeton Biomedix Incorporated, Princeton, N.J.

[22] Filed: Oct. 31, 1973

[21] Appl. No.: 411,228

[52] U.S. Cl. .................................. 23/230 B, 424/7
[51] Int. Cl. ............................................ G01n 33/16
[58] Field of Search ....................... 23/230 B; 424/7

[56] References Cited
OTHER PUBLICATIONS

Beutler, et al., J. Lab. and Clin. Med., 61,882 (1963).

Kaplan, et al., Chem. Abstr. 62, 4312a (1965).

*Primary Examiner*—Robert M. Reese
*Attorney, Agent, or Firm*—Sheldon J. Singer

[57] ABSTRACT

A method for the quantitative colorimetric determination of reduced glutathione in blood. The method includes mixing a sample of the blood with a reagent containing stabilized tungstic acid, ethanol, and 5,5'-dithiobis (2-nitrobenzoic acid). The mixture is centrifuged and the optical density of the supernatant is measured. The supernatant is mixed with a buffer to get a final pH of from about 7 to about 10, and the optical density is again measured. The glutathione concentration is determined from the optical density measurements.

7 Claims, No Drawings

GLUTATHIONE REAGENT AND TEST METHOD

BACKGROUND OF THE INVENTION

This invention relates to the determination of thiol-containing compounds in biological fluids, and more particularly, this invention relates to the determination of reduced glutathione in blood.

Virtually all of the non-protein sulfhydryl of the red blood cell is in the form of reduced glutathione (GSH). This vital component for normal cell life helps maintain hemoglobin in a reduced state and protects the red cell from oxidative damage. Glutathione is also believed to be involved in the maintenance of sulfhydryl groups of cell membrane proteins in the active reduced state. Low levels of hydrogen peroxide are detoxified by glutathione through glutathione peroxidase. The oxidized glutathione is in turn reduced back to glutathione by the enzyme glutathione reductase with the aid of NADPH.

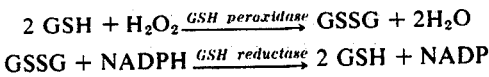

The only source of NADPH available to the mature red blood cell is that produced in the hexose monophosphate shunt pathway of glucose metabolism. In glucose-6-phosphate dehydrogenase deficiencies, NADPH is not produced in quantities sufficient to maintain glutathione in the reduced state. In consequence low concentrations of GSH are found in G-6-PD deficiencies, especially during episodes of drug-induced hemolytic anemias.

Hereditary deficiency of glutathione in the red cell stemming primarily from a deficiency of glutathione synthetase has been described by a number of investigators. This condition is characterized by a well-compensated hemolytic disease and a very low level of red cell glutathione, usually less than 10% of the normal level.

Low concentrations of glutathione are also associated with genetic deficiency of glutathione reductase. Theil, et al., have shown a significant decrease of blood glutathione levels in patients with acute renal insufficiency. Elevated values of GSH are found in patients with myelofibrosis.

Inability of the red cell to maintain its glutathione level in the face of acetylphenylhydrazine induced stress is a consistent finding in glucose-6-phosphate dehydrogenase, 6-phosphogluconate dehydrogenase, GSH synthetase and, GSSG reductase deficiencies. The glutathione stability test as originally developed by Beutler in which the glutathione level is measured in whole blood, or in washed red cells, prior to and after 2 hour incubation with acetylphenylhydrazine offers a useful method for differentiating normal from affected individuals.

Glutathione is a cofactor for the enzyme glyoxalase and is bound as a prosthetic group to the enzyme glyceraldehyde-3-phosphate dehydrogenase.

Chemically, glutathione can be considered a tripeptide of glycine, glutamic acid, and cysteine. Glutathione has the following structure:

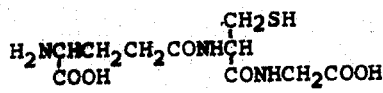

The most notable of the prior art methods for measuring reduced glutathione is that described by Beutler, et al., J. Lab. and Clin. Med., 61 (882–888), 1963. The method of Beutler, et al., is an improvement over the methods used theretofore and involves adding a sample of whole blood to distilled water and then mixing in a solution of glacial metaphosphoric acid, disodium or dipotassium ethylenediamine tetraacetic acid, and sodium chloride. The mixture is filtered and the filtrate is added to a phosphate solution. Finally, 5,5'-dithiobis-(2-nitrobenzoic acid) is added and the optical density is measured against a blank.

There are various disadvantages associated with the Beutler, et al., procedure. First, the metaphosphoric acid reagent must be stored at 4°C in order to achieve maximum stability which, even at that temperature, is approximately 3 weeks. Also, since three separate solutions are used, a dilute mixture is obtained for the final reading so that a cuvette with a critical volume of 10ml or more must be used.

SUMMARY OF THE INVENTION

It is, therefore, an object of the present invention to provide a method for the determination of reduced glutathione which is free of the aforementioned and other such disadvantages.

It is still another object of the present invention to provide a method for the quantitative determination of reduced glutathione which is simple and easy to perform.

It is further object of the present invention to provide a method for the quantitative determination of reduced glutathione requiring only one reagent solution.

It is yet another object of the present invention to provide a method for the quantitative determination of reduced glutathione which provides a greater recovery of glutathione than has been possible heretofore.

It is a still further object of the present invention to provide a composition for use in the quantitative determination of reduced glutathione.

Consistent with the foregoing objects, the present invention provides a method for the quantitative determination of thiolcontaining compounds in biological fluids, and more particularly, for the determination of glutathione in blood, comprising the steps of mixing an aliquot of the biological fluid with a reagent comprising stabilized tungstic acid, ethanol, and 5,5'-dithiobis (2-nitrobenzoic acid), separating the supernatant from the precipitate which forms, measuring the optical density of the supernatant against water at 412 nm, mixing the supernatant with a buffer so that the pH of the mixture is from about 7 to about 10, measuring the optical density of the mixture at 412 nm, and determining the concentration of the thiol-containing compounds.

This invention will be better understood and objects other than those set forth above will become apparent when consideration is given to the following detailed description thereof. While the detailed description is presented in terms of a preferred embodiment, it is to be distinctly understood that the invention is not limited thereto.

DESCRIPTION OF THE PREFERRED EMBODIMENT

As has been already noted, the Beutler, et al, procedure requires a precipitating solution of glacial metaphosphoric acid, EDTA, and sodium chloride, this solution being stable for approximately three weeks at 4°C. Additionally, a phosphate solution is necessary which also must be stored under refrigeration. Finally, there is a reagent solution of 5,5'-dithiobis (2-nitrobenzoic acid) in a citrate buffer. This reagent is stable for about 13 weeks under refrigeration.

The instant invention, on the other hand, relies on a single reagent solution which includes stabilized tungstic acid, ethanol, and 5,5'-dithiobis (2-nitrobenzoic acid). Tungstic acid is known as a de-proteinizing reagent for other procedures, but it is present in the reagent of the present invention in about double the usual concentrations, although slightly less amounts could be used. A higher concentration of 5,5'-dithiobis (2-nitrobenzoic acid) is used in this reagent than is used by Beutler, et al., since it has been found that there is some loss of the same to the precipitate formed in the first step of the invention. The ethanol in the composition serves a two-fold purpose. First, it effects solubilization of the 5,5'-dithiobis (2-nitrobenzoic acid). Second, the alcoholic solution gives a specific gravity difference between the precipitate and the supernatant which promotes rapid separation during the centrifuging. Furthermore, the alcoholic solution gives a better extraction of glutathione since the normal value found is higher than by other methods.

EXAMPLE 1

The glutathione reagent included the following ingredients:

22.0 g Sodium Tungstate
1.04 g $H_3PO_4$ (anhyd)
8.26 g $H_2SO_4$ (anhyd)
400 ml Ethanol
0.4 g DTNB (5,5'-dithiobis (2-nitrobenzoic acid)
Balance of 1,000 ml made up with distilled water.

The procedure for making the reagent was as follows:
1. The sulfuric and phosphoric acid were added to 500 ml of distilled water and mixed well.
2. The sodium tungstate was dissolved in 50 ml of water and added with stirring to the dilute acid mixture. The 400 ml of ethanol was then added with stirring.
3. 0.4 g of DTNB (5,5'-dithiobis (2-nitrogenzoic acid) ) was then added and the mixture was stirred for 1 hour. The DTNB dissolves slowly so that a full hour is required.
4. The mixture was filtered and then dispensed into amber glass bottles and was ready for use.

EXAMPLE 2

The buffer used in the procedure is preferably a dry phosphate buffer, although any buffer which will provide a final pH of between about 7 and about 10 could be used. The preferred buffer is prepared as follows:

In order to prepare the buffer in a finely divided state suitable for rapid dissolution, one liter of an aqueous solution containing 198.7 g or $Na_2H\ PO_4$ (anhydrous) and 101.7 g of $KH_2PO_4$ (anhydrous) was prepared. One-half milliliter was then dispensed in a 5 ml tube and the solution freeze-dried. The dried buffer is stored under a dessicant as it is slightly hygroscopic.

The composition of the portion of dried buffer in each 5 ml tube is as follows:

| | |
|---|---|
| $Na_2H\ PO_4$ | 0.099 g |
| $KH_2PO_4$ | 0.051 g |
| Total | 0.15 g |

EXAMPLE 3

The procedure for making the glutathione determination is as follows:
1. 2.3 ml of distilled water is placed in a 5 ml tube.
2. 0.2 ml of whole blood is added and mixed.
3. A 5-minute period of lysing takes place.
4. 2.5 ml of the reagent of Example 1 is added.
5. A cover is placed over the tube and the mixture is shaken vigorously for 5 seconds to 20 seconds, or mixed well on a Vortex mixer, to give a smooth, gray-colored product.
6. The tube is then centrifuged for 5 minutes at 2,000 rpm.
7. 2.5 ml of supernatant is carefully removed with a pipet and placed in a 1.0 cm square cuvette.
8. The optical density at 412 nm is measured against water.
9. The cuvette contents are poured into the dry buffer prepared in Example 2 and swirled until the buffer is dissolved, giving a pH of 7.
10. The optical density is remeasured exactly 5 minutes after the buffer is added.
11. The hematocrit is determined for each sample of blood.

The concentration is then determined according to the formula:

$C = [(OD_2 - OD_1)/11{,}000] \times (5/0.2) \times (100/\text{Hct.}) \times 307.3 \times 100 = [(OD_2 - OD_1)/\text{Hct.}] \times 6{,}984$ wherein C is the glutathione concentration in mg/100 ml red cells, $OD_1$ is the optical density of the supernatant before adding to the buffer, $OD_2$ is the optical density measured after the buffer is added, and Hct. is the hematocrit value of the blood sample in per cent. 307.3 is the molecular weight of glutathione.

It has been found that using a highly accurate instrument with a small slit width, the molar extinction coefficient of DTNB in this system is 11,000.

The hematocrit value of the blood sample is the packed red cell volume after centrifugation of the blood expressed as per cent of the whole blood sample.

EXAMPLE 4

| Blood Sample No. | Hematocrit | $OD_1$ | $OD_2$ | $\Delta OD$ | Concentration of Glutathione per 100 ml of Red Blood Cells |
|---|---|---|---|---|---|
| 1 | 22.9 | .058 | .549 | .491 | 150 |
| 2 | 23.5 | .044 | .367 | .323 | 96 |
| 3 | 44.0 | .041 | .685 | .644 | 102 |
| 4 | 25.3 | .053 | .507 | .454 | 125 |
| 5 | 35.1 | .045 | .532 | .487 | 97 |
| 6 | 47.1 | .059 | .711 | .652 | 97 |
| 7 | 43.1 | .061 | .695 | .634 | 102 |

—Continued

| Serum Sample No. | $OD_1$ | $OD_2$ | $\Delta OD$ | Concentration of Glutathione in the serum—mg/100 ml |
|---|---|---|---|---|
| 1 | .088 | .102 | .014 | 1 |
| 2 | .079 | .078 | .000 | 0 |
| 3 | .079 | .094 | .015 | 1.1 |
| Glutathione Standard 0.0497 g/100 ml | $OD_1$ | $OD_2$ | $\Delta OD$ | Found |
| 1 | .115 | .825 | .710 | .0495 g/100 ml |
| 2 | .116 | .815 | .699 | .0487 g/100 ml |
| 3 | .113 | .816 | .703 | .0492 g/100 ml |

The values of the serum samples illustrate that there is little, if any, glutathione present in sera, as is well known. The three standards illustrate the excellent reproducibility of the method.

It should be apparent from the foregoing detailed description that the objects set forth hereinabove have been successfully achieved. Moreover, while there is shown and described a present preferred embodiment of the invention, it is to be distinctly understood that the invention is not limited thereto, but may be otherwise variously embodied and practiced within the scope of the following claims. Accordingly,

What is claimed is:

1. A method for the quantitative determination of thiol-containing compounds in biological fluids comprising the steps of:
    a. mixing an aliquot of said biological fluid with a reagent comprising stabilized tungstic acid, ethanol, and 5,5'-dithiobis (2-nitrobenzoic zcid), to thereby obtain a precipitate and a supernatant;
    b. separating said supernatant from said precipitate;
    c. measuring the optical density of said supernatant against water at 412 nm;
    d. mixing said supernatant with a buffer such that the pH of the mixture is from about 7 to about 10;
    e. measuring the optical density of said mixture at 412 nm; and
    f. determining the concentration of said thiol-containing compounds.

2. A method for the quantitative determination of reduced glutathione in blood comprising the steps of:
    a. mixing an aliquot of blood with a reagent comprising stabilized tungstic acid, ethanol, and 5,5'-dithiobis-(2-nitrobenzoic acid), to thereby obtain a precipitate and a supernatant;
    b. separating said supernatant from said precipitate;
    c. measuring the optical density of said supernatant against water at 412 nm;
    d. mixing said supernatant with a buffer such that the pH of the mixture is from about 7 to about 10;
    e. measuring the optical density of said mixture at 412 nm; and
    f. determining the concentration of said reduced glutathione in said blood according to the relationship $$C = [(OD_2 - OD_1)/\text{Hct.}] \times 6984$$

wherein $C$ is the reduced glutathione concentration in mg/100 ml red cells, $OD_1$ is the optical density measured in step (c), $OD_2$ is the optical density measured in step (e), and Hct. is the hematocrit value of the blood sample in percent.

3. A method as defined in claim 2, wherein said tungstic acid is stabilized with phosphoric acid.

4. A method as defined in claim 3, wherein said reagent consists essentially of an aqueous solution of from about 11 to about 30.0 g of sodium tungstate, from about 0.52 to about 2 g of $H_3PO_4$, from about 4.13 to about 15 g of $H_2SO_4$, 400 ml of ethanol, and from about 0.2 to about 0.6 of 5,5-dithiobis (2-nitrobenzoic acid) per 1000 ml of solution.

5. A method as defined in claim 4, wherein said reagent consists essentially of 22.0 g of sodium tungstate, 1.04 g of $H_3PO_4$, 8.26 g of $H_2SO_4$, 400 ml of ethanol, and 0.4 g of 5,5'-dithiobis (2-nitrobenzoic acid) per 1,000 ml of solution.

6. A method as defined in claim 2, wherein said buffer is a phosphate buffer.

7. A method as defined in claim 6, wherein said buffer is prepared by dissolving $Na_2HPO_4$ and $KH_2PO_4$ in water and freeze-drying the solution, thereby obtaining a finely divided dry buffer.

* * * * *